(12) United States Patent
Robinson et al.

(10) Patent No.: US 8,930,687 B1
(45) Date of Patent: Jan. 6, 2015

(54) SECURE DISTRIBUTED DEDUPLICATION IN ENCRYPTED DATA STORAGE

(71) Applicant: EMC Corporation, Hopkinton, MA (US)

(72) Inventors: Peter Alan Robinson, Enoggera Reservoir (AU); Eric Young, Annerley (AU)

(73) Assignee: EMC Corporation, Hopkinton, MA (US)

( * ) Notice: Subject to any disclaimer, the term of this patent is extended or adjusted under 35 U.S.C. 154(b) by 67 days.

(21) Appl. No.: 13/833,517

(22) Filed: Mar. 15, 2013

(51) Int. Cl.
G06F 12/14 (2006.01)

(52) U.S. Cl.
CPC .................................. G06F 12/1408 (2013.01)
USPC ............... 713/150; 380/30; 380/44; 380/277; 380/282; 380/285; 713/189; 713/181; 713/193; 713/162; 707/692; 707/737; 708/844; 711/162

(58) Field of Classification Search
CPC ............ G06F 12/1408; G06F 11/1453; H04L 9/3236
USPC ....................................................... 713/150
See application file for complete search history.

(56) References Cited

U.S. PATENT DOCUMENTS

| | | | |
|---|---|---|---|
| 7,308,097 B2 * | 12/2007 | Hoffstein et al. ............... | 380/28 |
| 7,760,873 B2 * | 7/2010 | Gueron et al. .................. | 380/30 |
| 8,495,392 B1 * | 7/2013 | Bardale ........................ | 713/193 |
| 2004/0030932 A1 | 2/2004 | Juels et al. | |
| 2004/0193875 A1 * | 9/2004 | Aura .............................. | 713/162 |
| 2006/0005014 A1 * | 1/2006 | Aura et al. .................... | 713/162 |
| 2006/0020807 A1 * | 1/2006 | Aura et al. .................... | 713/176 |
| 2008/0069337 A1 * | 3/2008 | Gopal et al. .................... | 380/28 |
| 2010/0275028 A1 * | 10/2010 | Takashima .................... | 713/176 |
| 2012/0204024 A1 * | 8/2012 | Augenstein et al. .......... | 713/150 |
| 2012/0254173 A1 * | 10/2012 | Graefe ......................... | 707/737 |
| 2014/0136490 A1 * | 5/2014 | Saliba et al. .................. | 707/692 |

OTHER PUBLICATIONS

John Brainard et al, "A New Two-Server Approach for Authentication with Short Secrets," Proceedings of the 12th USENIX Security Symposium, pp. 201-213 (2003).

* cited by examiner

*Primary Examiner* — Morshed Mehedi
*Assistant Examiner* — Sharon Lynch
(74) *Attorney, Agent, or Firm* — BainwoodHuang

(57) ABSTRACT

In an encrypted storage system employing data deduplication, encrypted data units are stored with the respective keyed data digests. A secure equivalence process is performed to determine whether an encrypted data unit on one storage unit is a duplicate of an encrypted data unit on another storage unit. The process includes an exchange phase and a testing phase in which no sensitive information is exposed outside the storage units. If duplication is detected then the duplicate data unit is deleted from one of the storage units and replaced with a mapping to the encrypted data unit as stored on the other storage unit. The mapping is used at the one storage unit when the corresponding logical data unit is accessed there.

18 Claims, 4 Drawing Sheets

SECURE DISTRIBUTED DEDUPLICATION IN ENCRYPTED DATA STORAGE

BACKGROUND

The invention relates generally to the field of data storage.

In data storage systems it is known to use a technique or service referred to as "data deduplication". Data deduplication is realized as a specialized data compression technique for eliminating coarse-grained redundant data. The technique is used to improve storage utilization and can also be applied to network data transfers to reduce the amount of data that must be sent across a communications link. In the deduplication process, unique chunks of data, or byte patterns, are identified and stored during a process of analysis. As the analysis continues, other chunks are compared to the stored chunks, and whenever a match occurs the redundant chunk is replaced with a small reference that points to the stored chunk. Given that the same byte pattern may occur dozens, hundreds, or even thousands of times across an entire system, the amount of data that must be stored or transferred can be greatly reduced.

Another technique used in data storage systems is encrypted data storage, i.e., encrypting user data for persistent storage in encrypted form in the storage system, and providing user access to the data by decrypting it back into unencrypted form. Encryption generally improves data security, because the actual stored data (which is encrypted) has no meaning without the data encryption key. As long as keys can be protected separately from the storage devices, data is protected even when an attacker has direct access to the (encrypted) data actually residing on a storage device in the system.

SUMMARY

It may be desirable to employ data deduplication techniques in encrypted storage systems, achieving both the efficiency benefits of deduplication and the security benefits of encryption. However, this presents certain challenges, especially when a domain for deduplication extends across different disks or storage systems that use different data encryption keys. In this case, the stored data cannot be directly compared, because a given data unit is generally encrypted into different encrypted data units under the different encryption keys. Although other techniques might be usable, there is a danger of "leaking" information about the contents of a data unit if security precautions are not observed. Thus, there is a need for a deduplication technique that can be used in an encrypted storage system, to obtain the efficiency benefits of deduplication while at the same time maintaining the security provided by the data encryption.

A method is disclosed of providing data deduplication across first and second storage units in an encrypted storage system, where the storage units store respective data units encrypted under respective distinct data encryption keys. In part, the method employs the use of keyed data digests of the data units that are stored along with the encrypted data units, which may be created for example when the encrypted data units are first stored.

The method includes engaging in a secure equivalence detection process between the storage units, where the process employs respective asymmetric key pairs at the storage units, both key pairs being members of one mathematical prime group having a modulus and a generator. The mathematical underpinnings of the process may be similar to techniques known as Diffie-Hellman or Elliptic-Curve Diffie-Hellman key sharing.

An exchange phase includes the following steps. First, each storage unit calculates a respective product from the keyed data digest and the public key of the storage unit, and provides the calculated product to the other storage unit. At the first storage unit, a first quotient and a first hash are calculated, and the first hash is provided to the second storage unit, the first quotient calculated from the keyed data digest and public key of the first storage unit and the product of the second storage unit, and the first hash calculated as a message digest of the first quotient combined with the products of both storage units. At the second storage unit, a second quotient and second hash are calculated, and the second hash is provided to the first storage unit, the second quotient calculated from the keyed data digest and public key of the second storage unit and the product of the first storage unit, and the second hash calculated as a message digest of the second quotient combined with the first hash.

A testing phase includes one or both of (1) at the second storage unit, calculating a first candidate hash and comparing it against the first hash from the first storage unit, the first candidate hash calculated as a message digest of the second quotient combined with the products of both storage units, the comparing generating a second-unit indication whether the data units are duplicates, and (2) at the first storage unit, calculating a second candidate hash and comparing it against the second hash from the second storage unit, the second candidate hash calculated as a message digest of the first quotient combined with the second hash, the comparing generating a first-unit indication whether the data units are duplicates.

Based upon one or both the first-unit indication and the second-unit indication, the data unit can be deleted at one of the storage units and replaced with a mapping between an identifier of the data unit at the one storage unit and the data unit stored in the other storage unit. This selective deleting of redundant data units provides the efficiency benefit of deduplication.

The exchange process enables each storage unit to provide sufficient information to the other storage unit to perform the testing for duplication, but does so in a way that maintains the security provided by the encryption. In particular, there is no external exposure of the data digests that might leak information about the contents of the unencrypted data units.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
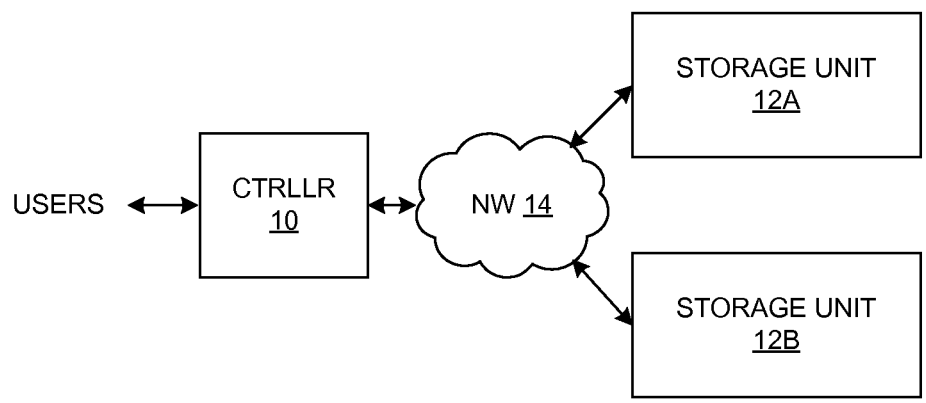
FIG. 1 is a block diagram of a storage system.

FIG. 1 shows a storage system having a storage controller (CTRLLR) 10 and two storage units 12 (12A and 12B respectively) coupled together via a network 14. The storage system employs data-at-rest encryption for increased data security. As generally known in the art, data-at-rest encryption is provided by establishing data encryption keys and persistently associating them with stored units of data, which are stored in encrypted form using the associated keys. Accessing the data requires presence and use of the data encryption key to decrypt the encrypted data. In the system of FIG. 1, the separate storage units 12A, 12B represent distinct devices and/or enclosures for purposes of encryption, i.e., it is assumed that they employ distinct sets of encryption keys for respective units of data that they store. In one simple form the storage units 12A, 12B might be just two different magnetic disks or two different arrays of high-density semiconductor storage (commonly referred to as "flash"). More complex forms are possible. The storage units 12A, 12B may correspond to distinct disk array enclosures (DAEs) of a larger integrated storage enclosure that also houses the storage controller 10, or at a larger scale they may correspond to entirely separate integrated enclosures housing tens or hundreds of disks and coupled to another enclosure that houses the storage controller 10.

The network 14 represents any set of communications connections that enables communications among the storage controller 10 and the storage units 12 as described herein. Its exact form will depend on the size and arrangement of the overall storage system, such as the examples given above.

Figure 2:
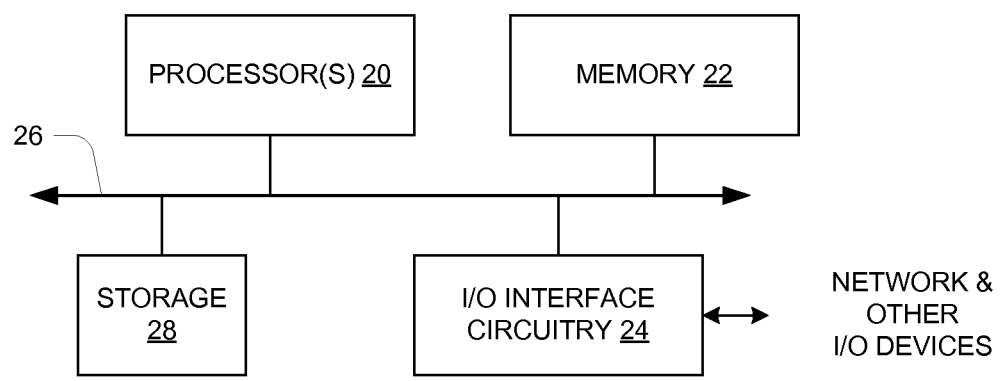
FIG. 2 is a hardware block diagram of a computer or controller.

FIG. 2 shows an example configuration of a physical computer or controller from a computer hardware perspective, which may be used to realize the controller 10 as well as a controller part of the storage units 12. The hardware includes one or more processors 20, memory 22, and interface circuitry 24 interconnected by data interconnections 26 such as one or more high-speed data buses. The interface circuitry 24 provides a hardware connection to the network 12 (FIG. 1) and perhaps other external devices/connections (EXT DEVs). The processor(s) 20 with connected memory 22 may also be referred to as "processing circuitry" herein. There may also be local storage 28 such as a local-attached disk drive or Flash drive. In operation, the memory 22 stores data and instructions of system software (e.g., operating system) and one or more application programs which are executed by the processor(s) 20 to cause the hardware to function in a software-defined manner. Thus the computer hardware executing instructions of a storage controller application, such as described below, can be referred to as a storage controller circuit or simply "storage controller", and it will be understood that a collection of such circuits or components can all be realized and interact with each other as one or more sets of computer processing hardware executing computer programs as generally known in the art.

Referring again to Figure, the storage system provides a data service referred to as "data deduplication". Data deduplication is realized as a specialized data compression technique for eliminating coarse-grained redundant data. The technique is used to improve storage utilization and can also be applied to network data transfers to reduce the amount of data that must be sent across a communications link. In the deduplication process, unique chunks of data, or byte patterns, are identified and stored during a process of analysis. As the analysis continues, other chunks are compared to the stored chunks, and whenever a match occurs the redundant chunk is replaced with a small reference that points to the stored chunk. Given that the same byte pattern may occur dozens, hundreds, or even thousands of times (the match frequency is a factor of the chunk size), the amount of data that must be stored or transferred can be greatly reduced.

For present purposes, the unit of data which is being analyzed and for which duplicates are searched for is referred to as a "data unit". In general, there may be a variety of types of data units in different embodiments. In one embodiment it may be a disk sector or "block", but in other instances it could be other groupings. Deduplication is often done using digests of sectors that are generated as the sectors are saved to disk, rather than using the sectors themselves. Assuming use of a low-collision digest scheme, two sectors having the same digest are deemed to contain the same data, so that one can be treated as a duplicate for deduplication purposes.

Figure 3:
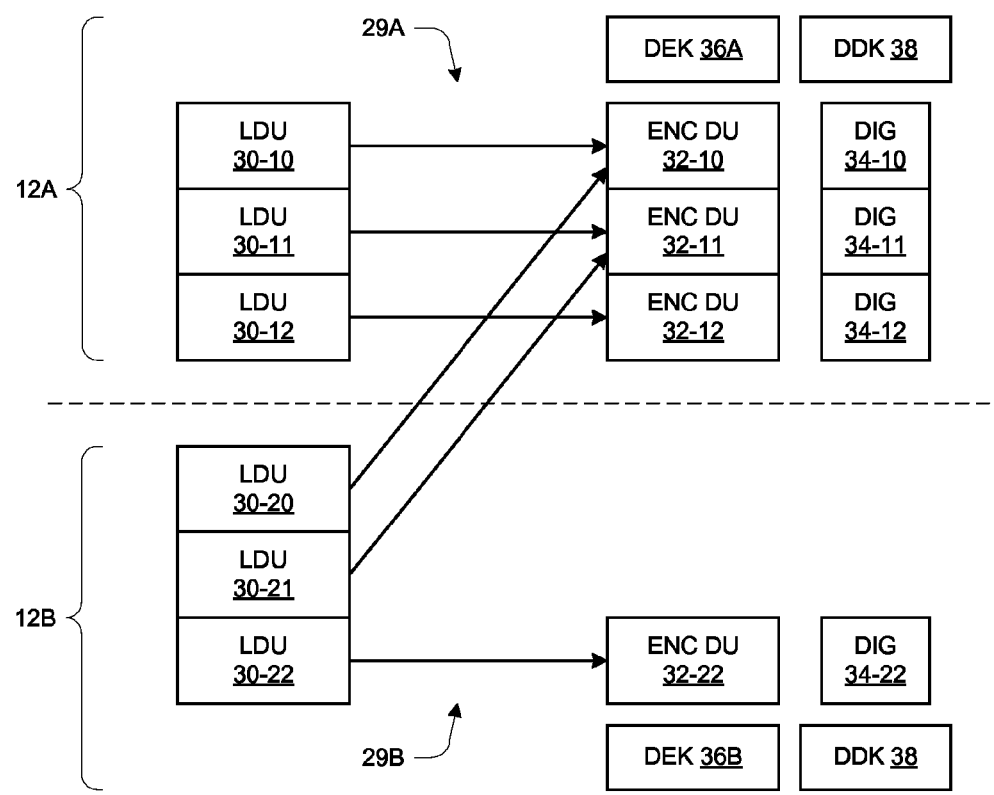
FIG. 3 is a schematic diagram depicting deduplication used in encrypted storage.

FIG. 3 is a simplified schematic depiction of deduplication in an encrypted storage system such as that of FIG. 1. At a high level, each storage unit 12 provides storage services to users via logical-to-physical mappings illustrated as lines 29A, 29B. From the users' perspective each storage unit 12 stores a set of data units that are represented in FIG. 3 as logical data units (LDUs) 30. These will be understood as addressable units of storage as generally known in the art. For example, the LDUs 30 of storage unit 12A may represent three successive blocks of an addressable storage volume provided by storage unit 12A, and similarly for those of storage unit 12B. The LDUs 30 are mapped to corresponding encrypted data units (ENC DU) 32 that are physically stored in the storage units 12. As illustrated and described below, the mappings 29 are managed and used in support of the data deduplication service.

Now more specifically, storage unit 12A provides storage for three LDUs 30-10, 30-11 and 30-12 by corresponding encrypted data units 32-10, 32-11 and 32-12 to which the LDUs 30 are directly mapped by mapping 29A. Along with encrypted data units 32 are stored respective digests (DIG) 34, shown as 34-10, 34-11 and 34-12. That is, each digest 34-$i$ and an associated encrypted data unit 32-$i$ are both generated from and for the same corresponding unencrypted data unit. A digest 34 may be calculated for a data unit at the time that it is initially stored. The encrypted data units 32 of storage unit 12A are encrypted and decrypted with a first data encryption key 36A, and the digests 34 are calculated using a data digest key (DDK) 38. This calculation is described briefly below. It will be appreciated that the storage unit 12A (and 12B likewise) requires data encryption circuitry as well as digest calculation circuitry, but these are omitted from FIG. 3 in the interest of clarity.

In a similar manner, storage unit 12B provides storage for three LDUs 30-20, 30-21 and 30-22. In this simplified example, only one encrypted data unit 32-22 and corresponding digest 34-22 are stored, to which the LDU 30-22 is directly mapped by mapping 29B. The encrypted data unit 32 of storage unit 12B is encrypted and decrypted with a second data encryption key 36B, and the digest 34 is calculated using the same data digest key (DDK) 38 as used in storage unit 12A.

As shown, the underlying storage for the LDUs 30-20 and 30-21 of storage unit 12B are provided by the storage unit 12A in the form of encrypted data units 32-10 and 32-11. This is the result of deduplication. At some point in operation it is discovered that the LDUs 30-20 and 30-21 are duplicates of the LDUs 30-10 and 30-11 respectively, and instead of storing duplicate underlying encrypted data units 32, these LDUs are instead mapped by mapping 29B to the corresponding encrypted data units 32 (which in the illustrated case happen to reside on the other storage unit 12A). In operation, any request for either LDU 30-20 or 30-21 is satisfied by retrieving the corresponding encrypted data unit 32-10 or 32-11, decrypting it within storage unit 12A and providing it to the storage unit 12B, and then completing the requested operation (e.g., returning data to a requestor) at storage unit 12B.

If non-encrypted storage were being provided, then deduplication would be straightforward. The storage units 12 receive and process data units in unencrypted form, and in that form they can be directly compared (perhaps through respective digests). The use of encryption complicates things, in particular when it is desired to provide deduplication across different storage units 12 that use different data encryption keys 36. In this case, one data unit generally maps to two distinct encrypted forms under the two distinct data encryption keys, and thus the encrypted forms cannot be compared to identify a duplicate. While it would be possible to use a digest scheme and exchange digests as necessary between the storage units for duplicate checking, this would leak information about the contents of the data units and thus reduce the level of security provided by the system.

Thus described below is a way of detecting duplicate encrypted data units 32 between different storage units 12 without decrypting the data units or revealing information that might compromise data security. This operation is provided while retaining the ability to delete the contents of an encrypted disk by simply deleting two keys for the disk (DEK 36 and DDK 38).

Figure 4:
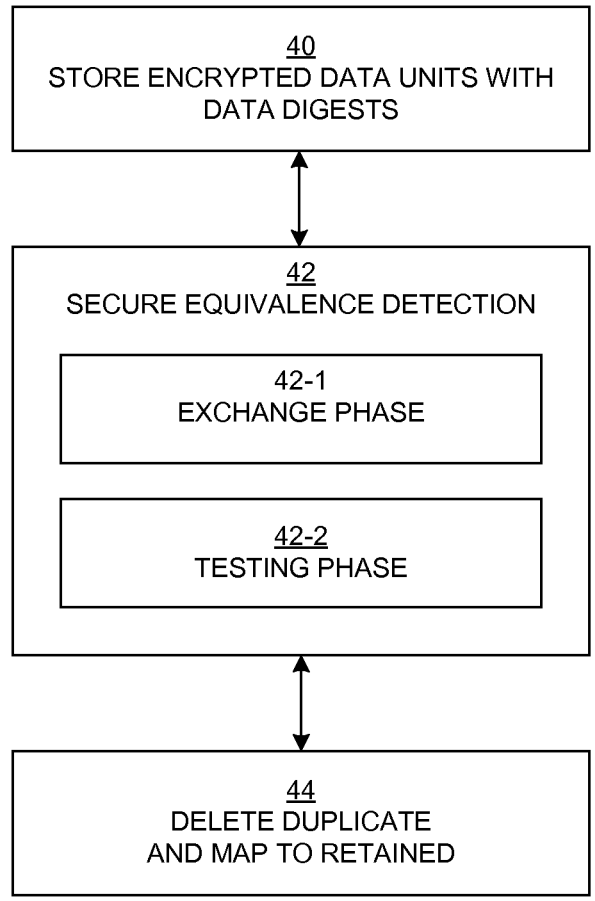
FIG. 4 is a flow diagram of a deduplication process.

FIG. 4 shows the overall operation, details of which are provided below. At 40, encrypted data units 32 are stored with the respective data digests 34, as outlined above. At 42, a secure equivalence process is performed to determine whether a given encrypted data unit 32 on one storage unit 12 is a duplicate of an encrypted data unit 34 on the other storage unit 12. This process has two sub-processes or phases, an exchange phase 42-1 and a testing phase 42-2 as shown. At 44, if duplication is detected then the duplicate data unit 32 is deleted from one of the storage units 12 and replaced with a mapping to the encrypted data unit 32 as stored on the other storage unit 12. The mapping is used at the one storage unit 12 when the corresponding LDU 30 is accessed there.

Configuration of a Storage Unit to Support Distributed Deduplication

Certain design and/or configuration approaches may be used. Data is encrypted as it is placed on the storage unit 12. A respective single symmetric data encryption key 36 may be used in a given storage unit 12 for encrypting all data units. In one configuration, a storage unit identifier such as a storage unit number may be used as the initialization vector for the symmetric cipher.

The data digests 34 are preferably created using a separate data digest key 38. Using a separate key is important as reusing the DEK 36 could weaken the security of the data encryption or the data digest 34.

The data digests 34 are referred to as "keyed" digests, used instead of plain unencoded digests to ensure that the data digests 34 of the encrypted data units 32 are not available to attackers who disassemble a stolen disk. An attacker could create the data digests for a complete set of small units of data, and then compare these digests with the digests on the disk. This form of attack could be successful when a data unit contains only a small amount of data. A variety of digest calculation schemes may be used, including the well-known family of message digests such as MD5 etc. However, good security can be obtained even using a weaker digest scheme, such as a hash-based message authentication code (HMAC) or simply XORing the plain data digests with the data digest key 38.

As mentioned, to delete a disk, the DEK 36 and DDK 38 are deleted. Performing storage encryption in this way ensures that data storage and de-duplication can continue to occur.

De-Duplicating Between Encrypted Storage Units

To allow de-duplication, the digest key 38 used with the keyed data digests 34 should be shared in some way between the storage units 12. This could be done by one of the following techniques for example:

1. Using a key agreement algorithm such as Diffie Hellman (DH) or Elliptic Curve Diffie Hellman (ECDH)
2. Using a Key Manager to supply the key.
3. Having the storage controller 10 supply the key.

To de-duplicate between two storage units 12, the storage controller 10 requests that one storage unit (e.g., 12A) check whether a certain data unit is equivalent to a data unit on the other storage unit (e.g., 12B). The storage units 12A and 12B use an equivalence protocol to determine whether the keyed data digests 34 of the data units is the same. If they are, then the storage controller 10 requests that one of the storage units 12 frees (deletes) the data unit, and establish and use a mapping 29 to indicate that the data unit resides on the other storage unit 12.

Using the equivalence protocol is better than simply having the storage units 12 exchange data digests 34, because it avoids exposing the data digests 34 outside the storage units 12. This reduces the information that can be obtained by an attacker.

Figure 5:
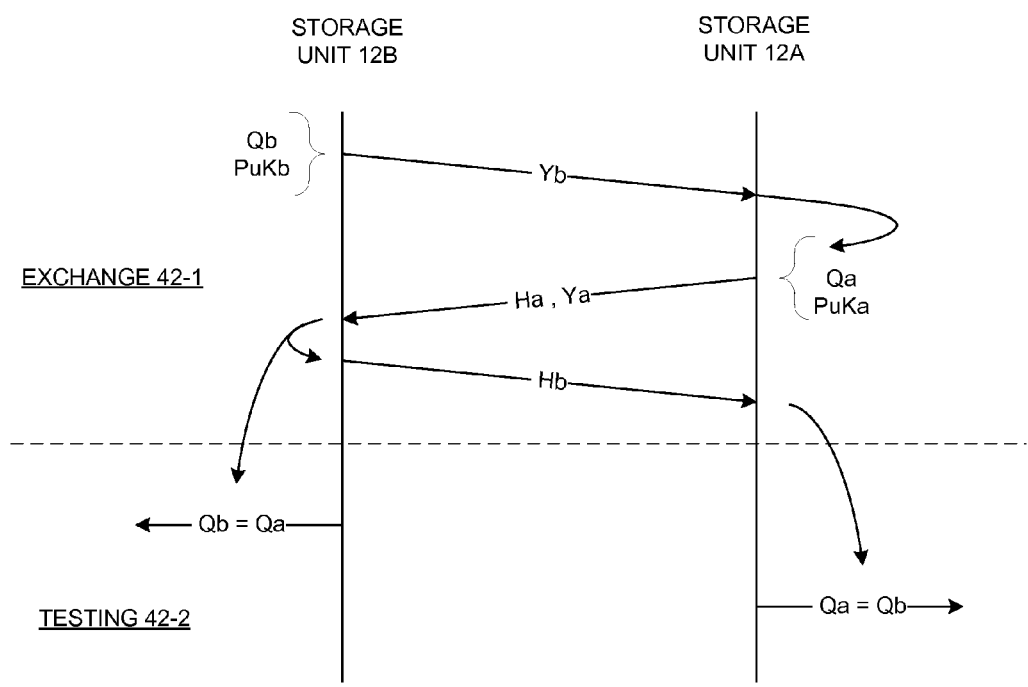
FIG. 5 is a messaging diagram for an equivalence process.

FIG. 5 illustrates part of the exchange phase 42-1 of the process of FIG. 4, in the form of a messaging diagram. This diagram is useful for understanding a flow and high-level operation of the exchange. Additional details, including internal calculations within each server 12, are provided below.

It is assumed that prior to the exchange process, the storage units 12 have been configured in some manner as part of a data deduplication domain, as generally known in the art, and that they also will have become configured with a shared digest key 38 as described above. Additionally the following will have occurred:

1. For each data unit in storage unit 12B:
Storage unit 12B generates a DH or ECDH key pair
Storage unit 12B calculates the keyed data digest 34 of the data unit and calls it Qb.
Note that the keyed message digest may have been generated previously, when the data unit was first stored to disk.
2. For each data unit in storage unit 12A:
Storage unit 12A generates a DH or ECDH key pair
Storage unit 12A calculates the keyed data digest of the data unit and calls it Qa.
Note that the keyed message digest may have been generated previously, when the data unit was first stored to disk.

Now turning to FIG. 5, the exchange phase 42-1 is a three-step process. Storage unit 12B uses Qb and its public key PuKb (of the DH key pair) to generate a product Yb which is sent to storage unit 12A. Storage unit 12A similarly generates a product Ya as well as a hash Ha that is generated in part from the product Yb received from the storage unit 12B (details below). In the third step, the storage unit 12B uses Ya received from storage unit 12A to generate a hash Hb and sends it to storage unit 12A.

During the testing phase 42-2, each storage unit 12 computes a "candidate" hash H based on certain data and compares it with the hash H received from the other storage unit. This comparison yields a result indicating whether Qa and Qb match, i.e., whether the data units are duplicates.

The storage units 12 may keep a list of which data units they have identified as equivalent or duplicates. These lists may be given to the storage controller 10, which in turn may exert control to tell each storage unit 12 which data units(s) is/are to be deleted and mapped to the other storage unit 12.

Although in general the hash comparing can be done at both storage units 12 as shown, in practice it may suffice to perform this function at only one of the storage units 12, for example the storage unit 12 that will replace its copy of the encrypted data unit 32 with a mapping 29 to an encrypted data unit 32 on the other storage unit 12.

Equivalence Protocol Detail

Below is provided a more detailed description of the calculations and messages during the exchange phase 42-2. Note that this variant of the protocol uses Diffie Hellman constructs. Alternatively, Elliptic Curve Diffie Hellman constructs can be used with appropriate curves.

The following algorithm is used to determine equivalence. This description uses the labels "blue" and "red", which correspond to B/b and A/a respectively in the above description (i.e., Qblue refers to Qb above and the keyed data digest 34 on the storage unit 12B, whereas Qred refers to Qa above and refers to the keyed data digest 34 on the storage unit 12A).

1. Input
Determine if the following values are equivalent:
Qblue
Qred
2. Initialization
Agree on g and p, the generator and modulus respectively of a prime mathematical group G (standard part of DH operation)
On both the Blue and Red systems, calculate a respective private key as an exponent e (eblue, ered) from G, which will be kept secret, and a corresponding public key $g^e$ mod p
3. At Blue system:
Calculate Ablue=Message Digest (Qblue)
Calculate product Yblue=Ablue·$g^{eblue}$ mod p
Message 1—send Yblue to the Red system
4. At Red system:
Calculate Ared=Message Digest (Qred)
Calculate product Yred=Ared·$g^{ered}$ mod p
Calculate quotient Zred=(Yblue/Ared)·$g^{ered}$ mod p
Calculate hash Hred=Message Digest(Zred∥Yred∥Yblue)
Message 2—send Yred and Hred to the Blue system
5. At Blue system:
Calculate quotient Zblue=(Yred/Ablue)·$g^{eblue}$ mod p
Calculate hash Hblue=Message Digest(Zblue∥Hred)
Message 3—send Hblue to the Red system
6. Testing at Blue system:
Calculate CandidateHred=Message Digest (Zblue∥Yred∥Yblue)
Blue system determines Qblue=Qred if CandidateHred=Hred
7. Testing at Red system:
Calculate CandidateHblue=Message Digest(Zred∥Hred)
Red system determines Qred=Qblue if CandidateHblue=Hblue While various embodiments of the invention have been particularly shown and described, it will be understood by those skilled in the art that various changes in form and details may be made therein without departing from the spirit and scope of the invention as defined by the appended claims.

What is claimed is:

1. A method of providing data deduplication across first and second storage devices in an encrypted storage system, comprising:
storing respective first and second data units along with respective first and second keyed data digests of the first and second data units at the first and second storage devices, the first and second data units encrypted under respective distinct data encryption keys, the first and second keyed data digests calculated from the respective first and second data units and a data digest key;
engaging in a secure equivalence detection process between the first and second storage devices to determine whether the first data unit stored at the first storage device is a duplicate of the second data unit stored at the second storage device, the process employing two distinct asymmetric key pairs having respective first and second public keys, both key pairs being members of one mathematical prime group having a modulus and a generator, the process including:
an exchange phase including (1) at each of the first and second storage devices, calculating respective first and second products from the respective first and second keyed data digests and the respective first and second public keys and providing the respective first and second products to the second and first storage devices respectively, (2) at the first storage device, calculating a first quotient and a first hash and providing the first hash to the second storage device, the first quotient calculated from the first keyed data digest and first public key and the second product, the first hash calculated as a message digest of the first quotient combined with the first and second products, and (3) at the second storage device, calculating a second quotient and second hash and providing the second hash to the first storage device, the second quotient calculated from the second keyed data digest and second public key and the first product, the second hash calculated as a message digest of the second quotient combined with the first hash; and
a testing phase including one or both of (1) at the second storage device, calculating a first candidate hash and comparing it against the first hash from the first storage device, the first candidate hash calculated as a message digest of the second quotient combined with the first and second products, the comparing generating a second-unit indication whether the second data unit is a duplicate of the first data unit, and (2) at the first storage device, calculating a second candidate hash and comparing it against the second hash from the second storage device, the second candidate hash calculated as a message digest of the first quotient combined with the second hash, the comparing generating a first-unit indication whether the first data unit is a duplicate of the second data unit; and
based upon the first-unit indication and/or the second-unit indication, deleting the data unit at the respective first and second storage devices and creating a respective mapping between an identifier of the respective first or second data unit at the respective first or second storage device and the respective second or first data unit stored in the respective second or first storage device,
wherein the first and second storage devices have different data access characteristics to collectively provide storage over different phases of a data lifecycle, and wherein deduplication is performed as part of migrating the respective first or second data unit from the respective first or second storage devices to the respective second or first storage device.

2. A method according to claim 1, wherein the first quotient is calculated as the second product divided by the first keyed data digest and multiplied by the first public key, and the second quotient is calculated as the first product divided by the second keyed data digest and multiplied by the second public key.

3. A method according to claim 1, wherein the first hash is calculated as a message digest of the first quotient concatenated with the first and second products, and the second hash is calculated as a message digest of the second quotient concatenated with the first hash.

4. A method according to claim 1, wherein one of the first and second storage devices provides on-line access to the respective first or second data unit while the other one of the first and second storage devices provides near-line or backup access to the respective second or first data unit.

5. A method according to claim 1, wherein the first and second keyed data digests are created using a hashing function based on the data digest key.

6. A method according to claim 5, wherein the hashing function is selected from hash-based message authentication code and exclusive-ORing.

7. A method according to claim 1, wherein the first and second storage devices engage in a key agreement protocol to arrive at the data digest key used by both storage devices.

8. A method of operating a storage device as a first storage device providing data deduplication with a second storage device in an encrypted storage system, comprising:
   storing a first data unit along with a respective first keyed data digest of the data unit, the first data unit encrypted under a data encryption key, the first keyed data digest calculated from the first data unit and a data digest key;
   engaging in one side of a secure equivalence detection process with the second storage device to determine whether the first data unit is a duplicate of a second data unit stored at the second storage device, the process employing two distinct asymmetric key pairs having respective first and second public keys, both key pairs being members of one mathematical prime group having a modulus and a generator, the one side of the process including:
   an exchange phase including (1) calculating a first product from the first keyed data digest and the first public key and providing the first product to the second storage device, (2) calculating a first quotient and a first hash and providing the first hash to the second storage device, the first quotient calculated from the first keyed data digest and first public key and a second product received from the second storage device, the first hash calculated as a message digest of the first quotient combined with both the first and second products, and (3) receiving a second hash from the second storage device, the second hash calculated at the second storage device as a message digest of a second quotient combined with the first hash, the second quotient being calculated at the second storage device from a second keyed data digest of the second data unit stored at the second storage device and the second public key and the first product; and
   a testing phase including calculating a candidate hash and comparing it against the second hash from the second storage device, the candidate hash calculated as a message digest of the first quotient combined with the second hash, the comparing generating a first-unit indication whether the first data unit is a duplicate of the second data unit stored at the second storage device; and
   based upon the first-unit indication, deleting the first data unit and creating a mapping between an identifier of the first data unit at the first storage device and the second data unit stored in the second storage device,
   wherein the first and second storage devices have different data access characteristics to collectively provide storage over different phases of a data lifecycle, and wherein deduplication is performed as part of migrating the respective first or second data unit from the respective first or second storage devices to the respective second or first storage device.

9. A method according to claim 8, wherein the first quotient is calculated as the second product divided by the first keyed data digest and multiplied by the first public key, and the second quotient is calculated as the first product divided by the second keyed data digest and multiplied by the second public key.

10. A method according to claim 8, wherein the first hash is calculated as a message digest of the first quotient concatenated with the first and second products, and the second hash is calculated as a message digest of the second quotient concatenated with the first hash.

11. A method according to claim 8, wherein one of the first and second storage devices provides on-line access to the respective first or second data unit while the other one of the first and second storage devices provides near-line or backup access to the respective second or first data unit.

12. A method according to claim 8, wherein the first and second keyed data digests are created using a hashing function based on the data digest key.

13. A method according to claim 12, wherein the hashing function is selected from hash-based message authentication code and exclusive-ORing.

14. A method according to claim 8, wherein the first and second storage devices engage in a key agreement protocol to arrive at the data digest key used by both storage devices.

15. A non-transitory computer-readable medium storing computer program instructions, the instructions being executable by a controller of a first storage device to cause the first storage device computers to perform a method of providing data deduplication with a second storage device in an encrypted storage system, the method including:
   storing a first data unit along with a respective first keyed data digest of the data unit, the first data unit encrypted under a data encryption key, the first keyed data digest calculated from the first data unit and a data digest key;
   engaging in one side of a secure equivalence detection process with the second storage device to determine whether the first data unit is a duplicate of a second data unit stored at the second storage device, the process employing two distinct asymmetric key pairs having respective first and second public keys, both key pairs being members of one mathematical prime group having a modulus and a generator, the one side of the process including:
   an exchange phase including (1) calculating a first product from the first keyed data digest and the first public key and providing the first product to the second storage device, (2) calculating a first quotient and a first hash and providing the first hash to the second storage device, the first quotient calculated from the first keyed data digest and first public key and a second product received from the second storage device, the first hash calculated as a message digest of the first quotient combined with both the first and second products, and (3) receiving a second hash from the second storage device, the second hash calculated at the second storage device as a message digest of a second quotient combined with the first hash, the second quotient being calculated at the second storage device from a second keyed data digest of the second data unit stored at the second storage device and the second public key and the first product; and a testing phase including calculating a candidate hash and comparing it against the second hash from the second storage device, the candidate hash calculated as a message digest of the first quotient combined with the second hash, the comparing generating a first-unit indication whether the first data unit is a duplicate of the second data unit stored at the second storage device; and based upon the first-unit indication, deleting the first data unit and creating a mapping between an identifier of the first data unit at the first storage device and the second data unit stored in the second storage device, wherein the first and second storage devices have different data access characteristics to collectively provide storage over different phases of a data lifecycle, and wherein deduplication is performed as part of migrating the respective first or second data unit from the respective first or second storage devices to the respective second or first storage device.

16. A non-transitory computer-readable medium according to claim 15, wherein the first quotient is calculated as the second product divided by the first keyed data digest and multiplied by the first public key, and the second quotient is calculated as the first product divided by the second keyed data digest and multiplied by the second public key.

17. A non-transitory computer-readable medium according to claim 15, wherein the first hash is calculated as a message digest of the first quotient concatenated with the first and second products, and the second hash is calculated as a message digest of the second quotient concatenated with the first hash.

18. A non-transitory computer-readable medium according to claim 15, wherein the first and second keyed data digests are created using a hashing function based on the data digest key.

* * * * *